US006922562B2

(12) United States Patent
Ward et al.

(10) Patent No.: US 6,922,562 B2
(45) Date of Patent: Jul. 26, 2005

(54) SYSTEM AND METHOD FOR PROVIDING INFORMATION SERVICES TO CELLULAR ROAMERS

(76) Inventors: Stephen L. Ward, 115 W. 3rd St., Frederick, MD (US) 21701; Richard J. Tett, 5925 Kensington Dr., Plano, TX (US) 75093

( * ) Notice: Subject to any disclaimer, the term of this patent is extended or adjusted under 35 U.S.C. 154(b) by 410 days.

(21) Appl. No.: 10/099,894

(22) Filed: Mar. 14, 2002

(65) Prior Publication Data

US 2002/0151305 A1 Oct. 17, 2002

Related U.S. Application Data

(63) Continuation of application No. 09/404,505, filed on Sep. 23, 1999, now abandoned.
(60) Provisional application No. 60/101,673, filed on Sep. 24, 1998.

(51) Int. Cl.[7] .............................. H04Q 7/20; H04Q 7/38
(52) U.S. Cl. ................. 455/436; 455/432.1; 455/432.2; 455/432.3; 455/414.1; 455/414.2; 455/552.1; 455/422.1; 370/466; 370/467
(58) Field of Search .............................. 455/403, 432.1, 455/432.2, 432.3, 466, 426.1, 426.2, 435.1, 435.2, 73, 552.1, 550.1, 551, 500, 517, 445, 448, 515, 456.1, 456.2, 456.3, 456.4, 456.5, 456.6, 457, 404.1, 404.2, 414.1, 414.2, 414.3, 422.1; 370/259, 466, 464, 467

(56) References Cited

U.S. PATENT DOCUMENTS

| | | | | |
|---|---|---|---|---|
| 5,930,699 A | * | 7/1999 | Bhatia | 455/456.3 |
| 6,097,966 A | * | 8/2000 | Hanley | 455/555 |
| 6,285,868 B1 | * | 9/2001 | LaDue | 455/410 |
| 2002/0077130 A1 | * | 6/2002 | Owensby | 455/466 |

* cited by examiner

Primary Examiner—Keith T. Ferguson
(74) Attorney, Agent, or Firm—Troutman Sanders LLP; James E. Schutz

(57) ABSTRACT

A method for providing information services to a wireless device roaming in a wireless system is disclosed. Normal network message traffic information is obtained from a wireless system. The normal network message traffic information is transmitted to a protocol converter. In the protocol converter, roamer information is extracted from the normal network message traffic information and converted into a protocol analyzer format. A query is transmitted to a Mobile Switching Center requesting information regarding the wireless device's serving cell or location. Information regarding the wireless device's serving cell or location is received and combined with the converted roamer information to form a roamer trigger. The roamer trigger is transmitted to protocol analyzer. In the protocol analyzer, specific information pieces regarding the wireless device are extracted. The extracted specific information pieces are transmitted to a data interpreter for translation and delivery to a wireless device.

8 Claims, 5 Drawing Sheets

SYSTEM AND METHOD FOR PROVIDING INFORMATION SERVICES TO CELLULAR ROAMERS

CROSS REFERENCE TO RELATED APPLICATION AND CLAIM OF BENEFIT

This application is a continuation of U.S. application Ser. No. 09/404,505 filed on Sep. 23, 1999, now abandoned, and claims the benefit of provisional patent application No. 60/101,673 filed on Sep. 24, 1998 and entitled "SYSTEM AND METHOD FOR PROVIDING TELECOMMUNICATION SERVICES TO CELLULAR ROAMERS", which is incorporated in its entirety by reference herein.

TECHNICAL FIELD

The present invention relates to wireless communications and, more particularly, relates to detecting the registration or attempted registration of a cellular telephone on a cellular system, especially under a roaming status, and providing telecommunication services, such as providing information messages and services for a targeted market, to the cellular telephone user over wireless public networks.

BACKGROUND OF THE INVENTION

Many individuals in the United States, and throughout the world, use wireless communications devices, such as cellular telephones, on a daily basis in their business or personal lives. Wireless communications service providers are increasingly becoming national and global in scope so that wireless communications devices operate in many different parts of the world. Because of the ability to use wireless communications devices in many parts of the world, travelers often travel with these devices.

A traveler arriving at a new destination is typically unfamiliar with amenities such as restaurants, recreation, lodging, etc. available at the destination. The traveler may directly inquire about one of these amenities if he is already aware of the amenity. For example, the traveler may use their wireless communications device to communicate with a restaurant by dialing directory assistance or directly dialing the restaurant. However, this is only in the case in which the traveler is already aware of the restaurant through some source such as advertising, etc. However, oftentimes, the traveler knows little about the amenities of a particular destination upon arrival.

The providers of these amenities could directly call the traveler on the traveler's wireless communications device if they knew the telephone number of the traveler's device and if they knew what information might be helpful to the traveler. There is much helpful information about the traveler and the traveler's device, including the traveler's telephone number, that already exists in the wireless system. This is the information derived in registering a roamer into a foreign network. However, this roaming information is available only to the wireless service providers.

Roaming in a wireless system typically functions as follows. When a traveler arrives at his destination and turns on or logs on his wireless communications device, a process known as Autonomous Registration occurs. The wireless device transmits a unique identifying data stream to the nearest base station of the local wireless system. The base station adds its unique cell/sector identification number to the Autonomous Registration data stream and sends the information to a mobile switching center, or MSC. The MSC determines whether the traveler's device is a "home" user with current billing information on file or whether it is a foreign user, i.e., roaming. If the MSC determines that the traveler's wireless communications device is roaming, it transmits an inquiry message to the home cellular network of the roaming device and verifies authorization and billing information. The MSC then allows the roaming device to register for calls by storing the device's registration information in a Visitor Location Register, or VLR. The registration information regarding a roaming wireless communications device is rich in information about the roaming device. From the information derived from the roaming device, assumptions can be made regarding the information needs of the traveler using the device. However, there has previously been no method or system for utilizing this information outside of the wireless system.

Thus, there is a need for a method and system for providing the registration information regarding a roaming wireless communications device to an outside service provider to provide messaging and other information to the roaming device. There is a further need for providing such a method and system without introducing new fault points into the existing wireless system or requiring significant modifications to the existing wireless system.

SUMMARY OF THE INVENTION

The present invention satisfies the above-described needs by providing a method for providing information services to a wireless device roaming in a wireless system. In one embodiment, normal network message traffic information is obtained from a wireless system. The normal network message traffic information comprises a Mobile Identification Number 1 (MIN 1), a Mobile Identification Number 2 (MIN 2), a Station Class Mark (SCM), and an Electronic Serial Number (ESN). The normal network traffic information may also comprise the System Identification Designation Number, or SID, of the wireless device's home wireless network. The normal network traffic information may further comprise roamer pre-selection options, GPS coordinates, and/or triangulation coordinates.

The normal network message traffic information is transmitted to a protocol converter. In the protocol converter, the roamer information is extracted from the normal network message traffic information and converted into a protocol analyzer format. A query is transmitted to a Mobile Switching Center requesting information regarding the wireless device's serving cell, or more precise location information from systems with location capability. Information regarding the wireless device's serving cell, or more precise location, is received and combined with the converted roamer information to form a roamer trigger. The roamer trigger is transmitted to a protocol analyzer. In the protocol analyzer, specific information pieces regarding the wireless device are extracted.

The extracted specific information pieces are transmitted to a data interpreter. In the data interpreter, the specific information pieces are translated into the format needed by a message selection device and an outcall interactive voice response (IVR) or short message service (SMS) server. The specific information pieces are transmitted to the message selection and outcall devices. The outcall message devices may then transmit messages and information to the wireless device.

DETAILED DESCRIPTION

The present invention is directed toward a system and a method for using internal messaging in a wireless telephone network to identify the status of a wireless telephone and to provide information or service messages to the wireless telephone based on the identified status. The status of the wireless telephone is determined by monitoring normal communication activity within the wireless telephone system to determine if a particular wireless telephone has a roaming status. If a wireless telephone is roaming, a roamer trigger is generated. The roamer trigger may comprise information regarding the roaming device's location, or serving cell, and the registration information of the roaming device. The roamer trigger or selected information in the roamer trigger is sent to a message selection device and then to an outcall IVR or SMS system. The message selection device utilizes the information about the roaming device to select a message to send to the roamer. The outcall IVR or SMS system then dials the roamer's wireless device to contact the roamer. For example, the system may send an information message regarding a restaurant or hotel in the local area. Voice prompts may be utilized so that the traveler may simply press a DTMF key or speak into the wireless device to receive menu information, location, prices, etc. or to directly contact the restaurant or hotel. Other information services include, but are not limited to, directions, emergency services, airline information, traffic, etc.

Exemplary Wireless System

Figure 1:
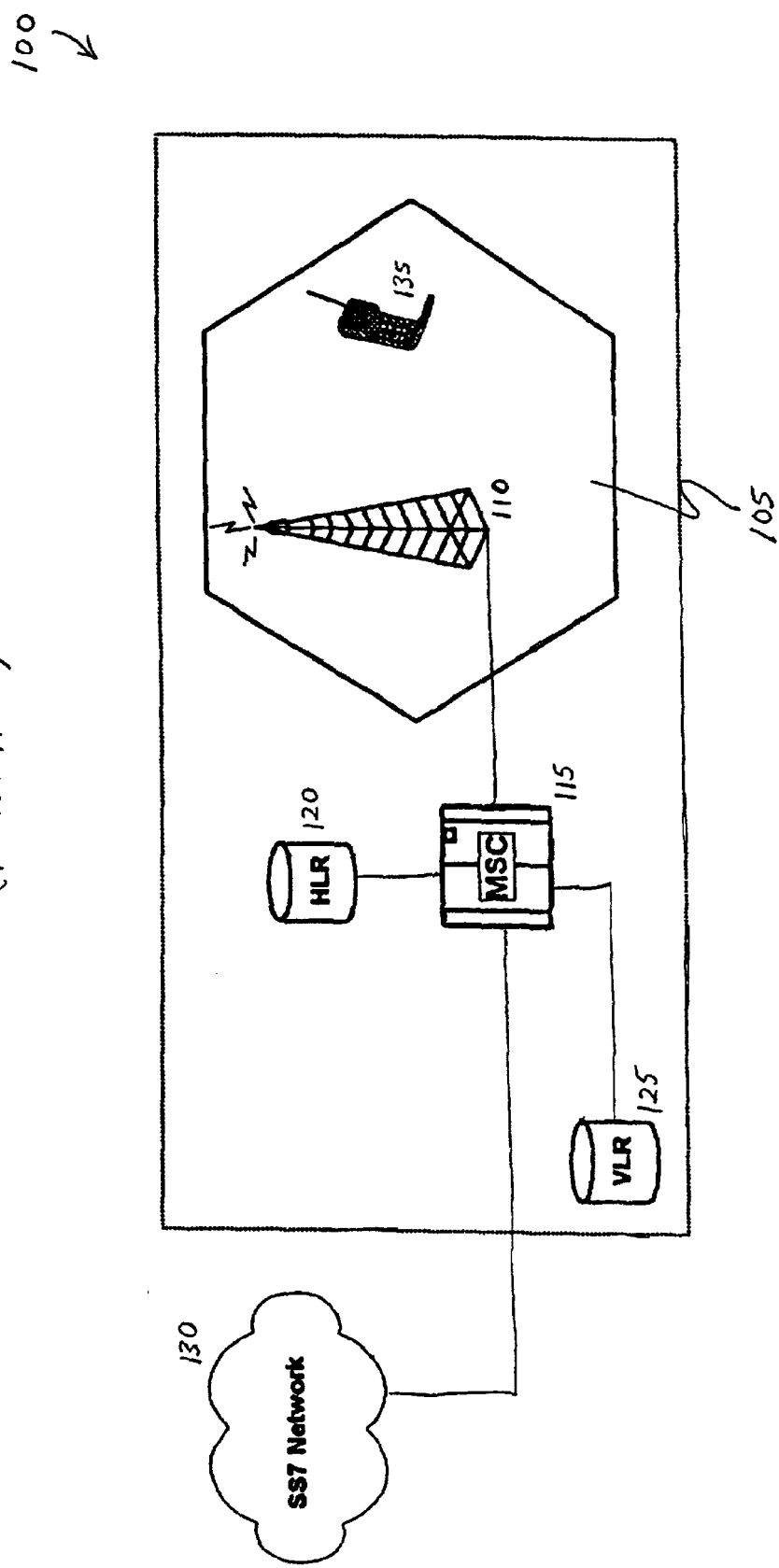
FIG. 1 is a diagram of an exemplary wireless system which an embodiment of the present invention accesses.

FIG. 1 is a diagram of an exemplary wireless system 100 which an embodiment of the present invention accesses to identify the status of a wireless telephone and to determine if a particular wireless telephone is roaming. Roaming is a well-known term referring to the use of a cellular telephone outside of its home wireless system. "Roamer" will be used herein to refer to the user of a roaming wireless device.

The wireless system 100 comprises a plurality of receiving cells 105, also known as entry cells. The receiving cells 105 form the basic geographic unit of the wireless system 100. Each receiving cell 105 comprises a base station 110, also known as a receiving cellsite. The base station 110 is a transmitter/receiver location, operated by a wireless service provider, through which radio links are established between the wireless system 100 and a wireless unit, such as cellular telephone 135. Each base station 110 serves a particular receiving cell 105.

The wireless system 100 may further comprise a mobile switching center 115, or MSC. The MSC 115 is a switch providing services and coordination between cellular users in the wireless system 100 and networks external to the wireless system. The wireless system 100 may further comprise a Home Location Register 120, or HLR. The HLR 120 is a database used to identify a wireless subscriber and to store subscriber data related to features and services.

The wireless system 100 may further comprise a Visitor Location Register 125, or VLR. The VLR 125 is a local database to the MSC 115 for registering visiting, or roaming, cellular telephones, such as cellular telephone 135. This information is typically retained at the VLR 125 as long as the roaming cellular telephone resides in the geographical area covered by the MSC 115. The VLR 125 obtains information from the home HLR of the roaming user to provide services to the roaming user. The VLR 125 may reside in the same location as the MSC 115.

The wireless system 100 may be connected to a plurality of networks, such as a Signaling System 7 network 130, or SS7 network.

Operation of the wireless system 100 in connection with a roaming cellular telephone will be described below with reference to FIG. 1. When a cellular telephone 135 enters within receiving range of a base station 110 or is turned on within range of a base station, it undergoes a process known as Autonomous Registration. This process is defined in Electronic Industries Association/Telecommunications Industry Association (EIA/TIA) standards 533 and 41D. In Autonomous Registration, the cellular telephone 135 transmits a unique identifying data stream to the nearest base station 110. The Autonomous Registration data stream typically comprises a Mobile Identification Number 1 (MIN 1); a Mobile Identification Number 2 (MIN 2); a Station Class Mark (SCM); and an Electronic Serial Number (ESN). The MIN 1, MIN 2, SCM and ESN will be further described below.

The MIN 1 is a seven digit code that corresponds to the cellular telephone's telephone number. The MIN 1 is used for both billing purposes and for receiving calls. The MIN 2 is the Numbering Plan Area (NPA), or area code, associated with the cellular telephone's telephone number.

The SCM identifies the functional characteristics of the particular model and make of the cellular telephone 135. Typically, the SCM is a two digit number that identifies certain capabilities of the cellular telephone. The manner in which a cellular system must handle a call is indicated in the SCM. For example, the SCM indicates whether a phone has SMS (short message service) capability and information could be sent via a text message as an option to voice prompts.

The ESN is uniquely associated with a specific cellular telephone without regard to the currently assigned telephone number. Cellular telephones may change their telephone number but never their unique ESN. Each cellular telephone is assigned a unique ESN, which is automatically transmitted to the base station 110 every time a cellular call is placed. The ESN is examined to ensure that it is valid, that the cellular telephone has not been reported stolen, that the user's monthly bill has been paid, etc. before permitting a call to be completed.

The base station 110 receives the Autonomous Registration data stream from the "registering" cellular telephone, adds its cell/sector identification number to the Autonomous Registration data stream and sends that information to the MSC 115. One of the functions of the MSC 115 is to look up the "registering" cellular telephone's data in its own system database, the HLR 120. This is to determine if the cellular telephone is a "home" user with current billing information on file or whether the cellular telephone is a foreign user, i.e., "roaming." If the registering cellular telephone is not found in the HLR 120, the MSC 115 generates an inquiry message based on EIA/TIA standard 41D.

The MSC 115 transmits the inquiry message over one of the national Signaling System 7 (SS7) networks 130 to the home cellular network of the "registering" cellular telephone. The MIN 1 and MIN 2 of the "registering" cellular telephone contains information that allows the inquiry message to be routed to the roaming cellular telephone's home cellular network. The telephone's home cellular network verifies that the "registering" telephone is indeed registered as an authorized user on the home cellular network and that the "registering" telephone has associated billing information. After this verification, the home cellular network adds its System Identification Designation Number (SID) to a return message that is transmitted to the MSC 115. The MSC 115 examines the SID to determine if there is a billing agreement between the companies that operate the base stations and allows or disallows the "registering" cellular telephone to register for calls based on this determination.

If the "registering" cellular telephone is allowed to register for calls, then the MSC 115 sends the "registering" cellular telephone's registration information, including the home SID, to the VLR 125. The VLR then stores that information and the "registering" cellular telephone becomes a "roaming" cellular telephone on the wireless system 100 and is authorized to make and receive calls. The MSC 115 stores the roaming cellular telephone's active cell/sector information and updates the cell/sector information as the roaming telephone moves through the wireless system 100.

The activity described above with regard to registering a roaming cellular telephone is well-known to those skilled in the art and could be classified as "normal network message traffic information" in a modem wireless network. The sequence of events and message flow is similar regardless of the wireless system's standard (i.e. AMPS/TDMA, CDMA and GSM/PCS standards).

Those skilled in the art will understand that the roaming telephone's registration information sent from the MSC 115 to the VLR 125 is rich with information about the roaming cellular telephone. Moreover, the MSC 115 maintains current information on the roaming telephone's cell location and new location equipment used for emergency 911 location can be queried for more exact location information. Wireless networks generate and use this information as part of their normal operation of connecting wireless calls. As further described below, an embodiment of the present invention extracts this "normal network message traffic information" from the wireless system 100 for use outside of and separate from the wireless system.

Figure 2:
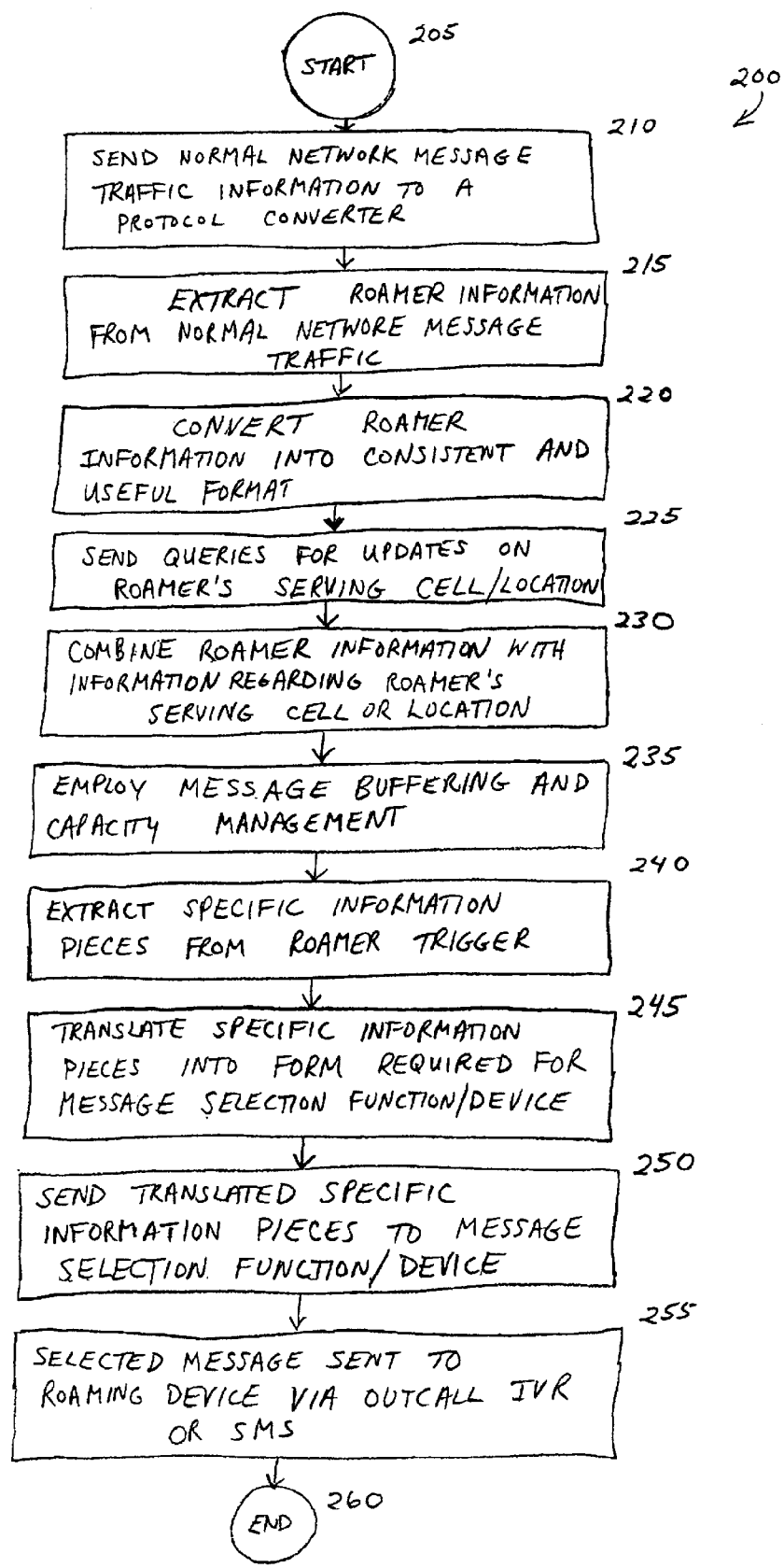
FIG. 2 is a flowchart illustrating a method for providing information services to a roaming cellular telephone in accordance with an embodiment of the present invention.

FIG. 2 is a flowchart illustrating a method 200 for providing telecommunications services to a roaming cellular telephone in accordance with an embodiment of the present invention. The method 200 will be described below with reference to the wireless system 100 of FIG. 1. The method 200 begins at start step 205 and proceeds to step 210 where the normal network message traffic information is sent to a protocol converter outside of and separate from the wireless system 100. As described above, the normal network message traffic information may comprise the roaming telephone's registration information and the current information on the roaming telephone's cell location.

The normal network message traffic information may be obtained from normal network message traffic in a number of different ways. In one embodiment of the present invention, if the VLR 125 is not located with the MSC 115, then the information may be obtained by line tapping. In other words, the information is obtained by tapping the connection between the VLR 125 and MSC 115.

In another embodiment, the information is obtained by receipt of a direct copy of the messages sent from the MSC 115 to the VLR 125 without any line tapping.

In still another embodiment, the information is obtained via messages from the VLR 125 and/or responses made to inquiries directed to the MSC 115 and VLR 125.

In yet another embodiment, the information is obtained by using an IS-41 monitoring device positioned in the wireless system 100 to monitor IS-41 traffic and extract roamer information messages. IS-41 is a signaling protocol used in the North American standard cellular system.

The exact method used to receive the normal network message traffic information will depend on the network architecture, vendor implementation of standards and the local engineering rules of the wireless system 100. Regardless of the method used, it is the intent of these methods to obtain the normal network message traffic information by being as unobtrusive as possible to the normal operation of the wireless system 100 so that no additional failure points are introduced in the system.

At step 215, the protocol converter extracts the roamer information from the network messages. The roamer information may comprise the ESN, MIN 1, MIN 2, pre-selection of call back greeting(s), SID of Home network, SCM, pre-selection options (such as block/no block), GPS coordinates and triangulation coordinates. At step 220, the roamer information is converted into a consistent and useful format for the protocol analysis function regardless of the wireless standards employed by the serving carrier or vendor specific variants involved. During this conversion, the information is categorized for use by decision algorithms. At step 225, the protocol converter function sends queries to the MSC for updates on the requested roamer's serving cell, or location. At step 230, this information regarding the requested roamer's serving cell or more exact location from network location equipment or GPS coordinates is incorporated with the extracted roamer information to form a "roamer trigger". The method 200 then proceeds to step 235.

At step 235, a message buffering and capacity management function is employed. It should be understood that because of the potential to have many roaming cellular telephones entering in a short period of time, the present invention must be able to buffer the incoming messages for capacity management. The method 200 can act upon the incoming information to form the "roamer trigger" as capacity becomes available. Because the buffering is performed outside of the wireless system 100, it does not interfere with the normal operation of the system. Thus, the carrier will see no additional delay in call completion rates. A simple message buffering releases the incoming messages as the system processor has capacity to process the messages.

At step 240, the roamer trigger is sent to a protocol analysis function for the extraction of the specific information pieces pertaining to a specific roaming cellular telephone. That specific information pieces are:
ESN
MIN 1
MIN 2
SID of Serving Network
Cell/Sector ID Number
Pre-Selection by roamer of call back Greeting(s)
SID of Home Network
SCM
Pre-Selection Options (Block, No Block)
Other embodiments may also use information in the roamer trigger such as:
GPS Coordinates from the handset
Triangulation Coordinates from network location equipment used for emergency 911 service At step 245, the specific information pieces extracted from the roamer trigger are sent to a "data interpreter" which translates the specific information pieces received from the protocol analysis function into a form that can be used by the service/information selection function. Specific data pieces are matched up with decision algorithms to determine what messages to send. At step 250, the specific information pieces are sent to the message selection function. At step 255, the selected message is sent to the roaming device via outcall IVR or SMS system(s). The method then ends at step 260.

Based on method 200, the following information is available for use by the outside service provider:

(a) the generation of the "roamer trigger" yields real time notification of the existence and arrival of a roamer, who is non-native to the area and carries a cellular telephone, which is on and logged into the local wireless system;

(b) the ESN yields the unique identification of the roamer's mobile telephone that can be tracked and profiled by a service provider over time;

(c) the MIN 1 and MIN 2 yield the telephone number of the roaming cellular telephone for potential call back;

(d) the SID of the roaming cellular telephone home network yields a general geographic indication of the roamer's home location and the roaming cellular telephone's home carrier;

(e) the SID also yields the identification of the serving network and any special characteristics associated with serving carrier's service, coverage and/or arrangements/service restrictions associated with that carrier;

(f) the SCM yields the type, make and model of the cellular telephone for determining feature capabilities and service delivery possibilities such as determining whether the roaming telephone can receive SMS (Short Message Service) messages in addition to voice;

(g) the cell/sector identification and the SID of the serving network yield the approximate location of the roamer's entry into the local area and the current serving cell/sector of the roaming cellular telephone upon request;

(h) pre-selections offered from the home network, such as the election to block all incoming calls while roaming or to block all calls from outside information sources;

(i) GPS and/or triangulation derived coordinates for determining the precise location of the roamer;

(j) knowing the unique ESN identity of the roamer and matching any prior selections or options made by the roamer and filed in a profile by the information provider/s (i.e. call salutation or requested greeting information upon call back) (pre-selection of greeting options and/or menu preferences); and (k) time of day or time stamp of the roamer's entry for the tailoring of information provided to the roamer.

Additional information can be derived from the roamer trigger as wireless standards and technologies evolve. The method 200 makes the above-described information available for making decisions regarding messaging and value added services.

The Message Selection Process

As a "roaming" cellular telephone enters a network and has its information extracted and processed, as described above, the service provider is provided with a plethora of decision criteria to evaluate the type, timing and method of delivery of their value-added services.

The information may be used to make decisions on content, timing and method of the value added messaging and information services sent to the "roaming" cellular telephone. This allows a service provider to individually tailor its message information and delivery method to each specific roamer.

The service provider may select messages based upon one or more of the following criteria:

1. Known entry of roamer into the local wireless network. The generation of the "roamer trigger" yields real time notification of the existence and arrival of a roamer, who is non-native to the area and carries a cellular telephone, which is on and logged into the local network. With the entry notification, the process of determining the appropriate message and call back delivery method may start.

2. Known unique identity of the roamer's cellular telephone. The ESN yields the unique identification of the roamer's cellular telephone that can be tracked and profiled by a service provider over time. The profile information may be used in the message selection process to determine the last message sent to the roamer so that the roamer does not receive repeated information. With a profile of how the roamer has responded to messages and menu choices in the past, the service provider can further tailor the message, menus and delivery method to each individual roamer.

3. The telephone number and area code of the roaming cellular telephone. The MIN 1 and MIN 2 yield the telephone number of the roamer for call back purposes. Once a message is selected, the service provider uses the roamer's telephone number to call the roamer through the local wireless system or from outside of the wireless network.

4. The general geographical location of the roaming cellular telephone's home network and the home carrier. This information is derived from the SID of the roaming cellular telephone's home network. Knowledge of the home location and home network provider can be used in determining message content and information provided. For example, a roamer from a St. Louis-based wireless carrier may be targeted with information messages concerning schedule and availability of tickets of St. Louis-based sports teams playing in the city in which he is currently roaming.

5. The SID of the serving network provides special characteristics associated with serving carrier's service, coverage and/or arrangements/service restrictions associated with the serving carrier. Because it is contemplated that the present invention would be connected to multiple wireless networks in a market, knowing the local network on which that specific roamer is logged is important for call back purposes. Additionally, the serving wireless carrier may have special requirements or arrangements with the service provider. These special requirements may include limiting the type of messaging allowed over their network, commercial arrangements that involve branding messages of the carrier or other franchise or commercial requirements associated with the serving wireless carrier.

6. The SCM provides the type and make of the cellular telephone for determining feature capabilities and service delivery possibilities. If the roaming cellular telephone is a digital telephone, there is the possibility that the roamer can receive SMS (Short Message Service) messages in addition to voice. This provides the service provider with the option of sending voice messaging, SMS messaging or a combination of both.

7. The cell/sector identification and the SID of the serving network provide the approximate location of the roamer's entry into the area and the current serving cell/sector of the roamer can be "mapped". This allows for significant tailoring of the messaging sent to the roamer. For instance, a roamer in a location near the airport might need information messages pertaining to activities or services oriented towards an air traveler as opposed to a roamer near a downtown location. It also gives the service provider the option to provide coarse or general directional information as part of the messaging to the roamer.

8. Pre-selections options offered from the home network. State PUCs or home carriers may require/offer pre-selection options to block all incoming calls while roaming or to block all calls from outside information sources. Given this information and knowledge of the roamer's cellular telephone capabilities, the roamer could be sent SMS information messages as opposed to voice as a means to complete the intended service.

9. GPS and/or triangulation derived coordinates for determining the precise location of the roamer. This will lend itself to specialized location information services that require precise start locations, such as detailed driving directions. Emergency 911 location systems are to be deployed by wireless carriers using the network derived or triangulation method.

10. The unique ESN identity of the roamer allows matching any selections or options with those previously made by the roamer and filed in a profile data base by the information provider/s. This allows the messaging to be tailored to individual needs and demonstrated preferences. For example, the roamer's selections regarding call salutation or requested greeting information upon call back may be stored in a profile database.

11. Time of day or time stamp of roamer entry is an important decision criterion for tailoring of information. For example, messaging in the evening might center around hotels, restaurants and entertainment whereas messaging in the morning might center around transportation needs, such as traffic problems or rental car information.

Each of the above criteria/information derived from the roamer represents the opportunity for the message provider to individually tailor and specifically select information messaging sent to the roamer. This adds significantly more value to the information sent.

As an example of an embodiment of the present invention, consider a cellular user whose home cellsite is in Los Angeles who is traveling to Dallas, Tex. When arriving in Dallas, the user turns on his cellular phone or otherwise logs in. The user would then receive an information message via his cellular phone. For example, the message may be similar to the following: "Welcome to Dallas. It's 90° F. and the Dow Jones is up 25 points. For local information on hotels, restaurants . . . press or say 'One.' This is a free call!"

Figure 3:
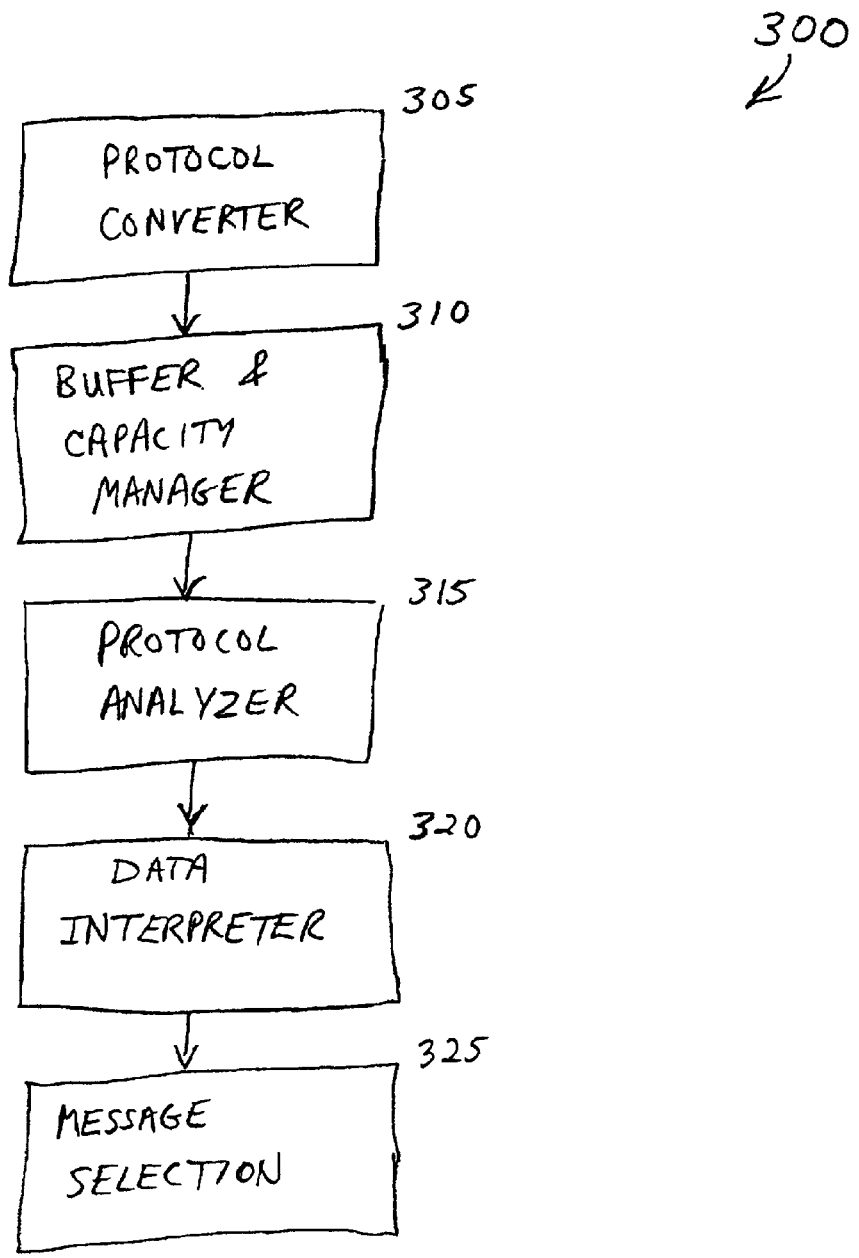
FIG. 3 is a block diagram of a system in accordance with an embodiment of the present invention.

Referring now to FIG. 3, a block diagram of a system 300 in accordance with an embodiment of the present invention will be described. The system 300 comprises a protocol converter 305. The protocol converter is programmed to recognize the formatting of multi-standard and multi-vendor signaling. The protocol converter also is programmed to communicate with the MSC 115 (FIG. 1) of the wireless system 100 where the roamer is located.

The system 300 also comprises a buffer and capacity manager 310. The buffer and capacity manager 310 buffers excess messages and manages the capacity of system 300 for message flow. The buffer and capacity manager may also be coordinated with capacity management data from the carrier to prevent cell congestion.

The system 300 further comprises a protocol analyzer 315. The protocol analyzer analyzes the following element: ESN, MIN 1, MIN 2, SID of roamer's home network, SID of serving network, SCM, cell/sector identification, pre-selection options (block/no block), GPS coordinates, and triangulation coordinates. The protocol analyzer stacks the incoming data into queues for feeding into the data interpreter.

The system 300 further comprises a data interpreter 320. The data interpreter 320 is able to determine the unique identification of the roaming cellular telephone for tracking purposes, the phone number of the roaming cellular telephone, the identification of the roamer's home carrier, the identification of the serving network, the make and model of the roaming cellular telephone, the location of the serving cell/sector within the serving carrier, any pre-selections from the roamer's home network (such as block/no block), GPS/triangulation for precise location information, pre-selection of greeting options and/or menu preferences, and time of day. The information provided by the data interpreter 320 is used by the message selection function/device 325 to determine the best and most useful information message to send to the roaming device. The message selection function/device 325 determines the message delivery type, such as IVR or SMS, or both. The data interpreter and message selection/function match the data with lookup tables and decision algorithms to determine which messages to send and in what format to send the messages.

Figure 4:
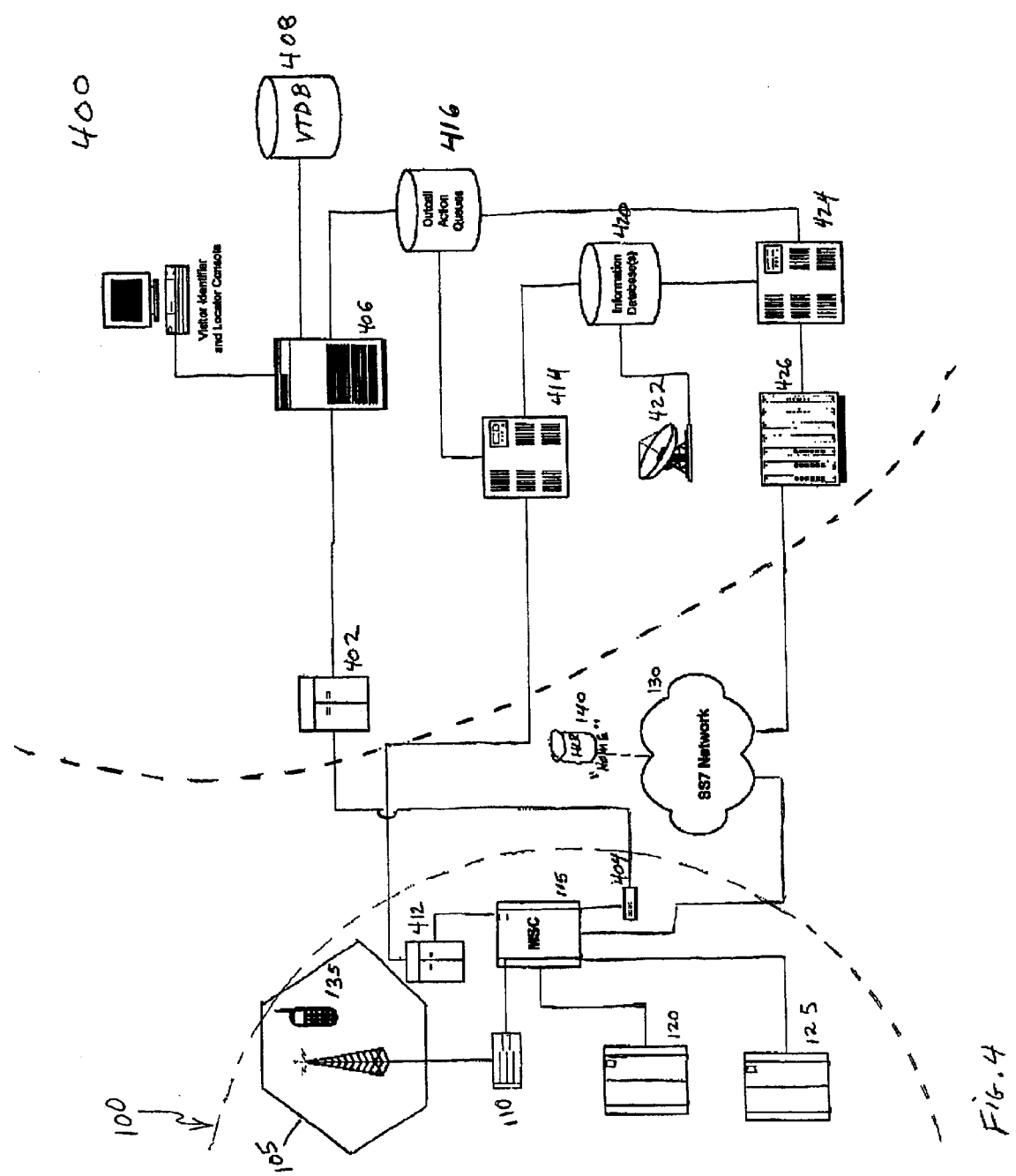
FIG. 4 is an illustration of a visitor information system in accordance with an embodiment of the present invention.

Referring now to FIG. 4, a visitor information system 400, or service center, in accordance with an embodiment of the present invention will be described. The system 400 monitors IS-41 "roamer" messages. The system 400 comprises an IS-41 Monitor and Filter (IMF) 402 connected to an existing wireless system 100 via a passive connector 404. The passive connector is located inside the carrier's network. The wireless system 100 may comprise a receiving cell 105 comprising a base station 110. The wireless system may further comprise a MSC 115 connected to a HLR 120, a VLR 125 and a SS7 network 130. The SS7 network 130 may be connected to the "home" HLR 140 of a roaming cellular telephone 135. The operation of wireless system 100 is well-known to those skilled in the art and has been described above in connection with FIG. 1.

In one embodiment of the invention, the IMF 402 is needed to recognize IS-41 Registration Notification requests and responses. The IMF 402 captures the contents of these messages and forwards a copy to a Visitor Identifier and Location Processor (VILP) 406. The IMF 402 may forward the contents of these messages by using TCP/IP or some other data protocol to send a proprietary formatted message to the VILP 406 containing the information in the respective message.

The IMF 402 is coupled to the inbound and outbound SS7/IS-41 trunks of a metropolitan MSC to monitor roamer registrations. A visitor tracking database (VTDB) 408 resides adjacent to the VILP 406. This database contains records of current and past roamer device activity, identified by its unique ESN. The records contain MIN1/MIN2, SID, ESN, entry dates and times, past message history, roamer selected options and last known location. Additional information may include information on the success of any previous contact with the roamer, any follow-up interaction initiated by the roamer, and a flag indicating if the roamer has requested not to be contacted.

In the visitor identifier and locator processor (VILP) 406 resides the decision logic and algorithms for selection of messages based on the data from the IMF 402 and information stored in the VTDB 408. The decision of how these messages are to be delivered, in voice or text, is also made in the VILP 406. The outcall action queues 416 store the message delivery request until the outcall IVR 424 or the outcall SMS server 414, depending on the message, is available. The outcall SMS server 414 takes the chosen text message and requests its delivery, via a TCP/IP connection, by the wireless carrier's own SMS message center 412. If the message is to be a voice message, then the message request is stored in the outcall action queues 416 and then sent to the outcall IVR 424. The outcall IVR 424 places its calls to the respective roaming devices. If a contact succeeds, any user responses (positive or negative) are added to the appropriate record in the VTDB 408. If a contact fails, this is also noted in the VTDB.

The VILP 406 receives roamer Registration Notification (REGNOT) information from the IMF 402. When it receives a REGNOT request, it extracts the MIN 1 and MIN 2 from each message and, by comparing it to those already in the VTDB 408, determines whether this is a new visitor. If it is, the VILP 406 adds the visitor to the database and waits for the REGNOT response or another REGNOT request. When the REGNOT response arrives, the VTDB 408 record is updated with the telephone's home system information provided in that message. If the telephone is already in the database 408, the VILP 406 may update the record to indicate a new registration.

The information database 420 is connected to public/private information sources 422.

The information database 420 is also connected to an Interactive Voice Response 424 (IVR). The IVR 424 is typically a multi-T1 IVR with the ability to be driven by an external system (in this case the VILP 406) to make outgoing calls and to report the results. The IVR 424 must also be able to accept incoming calls. On both outgoing and incoming calls, the IVR 424 must be able to take input from the roamer in response to prompts that allow the roamer to get information that has been recorded for playback. The IVR 424 will preferably interface to the telephone network via a T1 switch 426 controlled by an SS7 control link interface (not shown).

Figure 5:
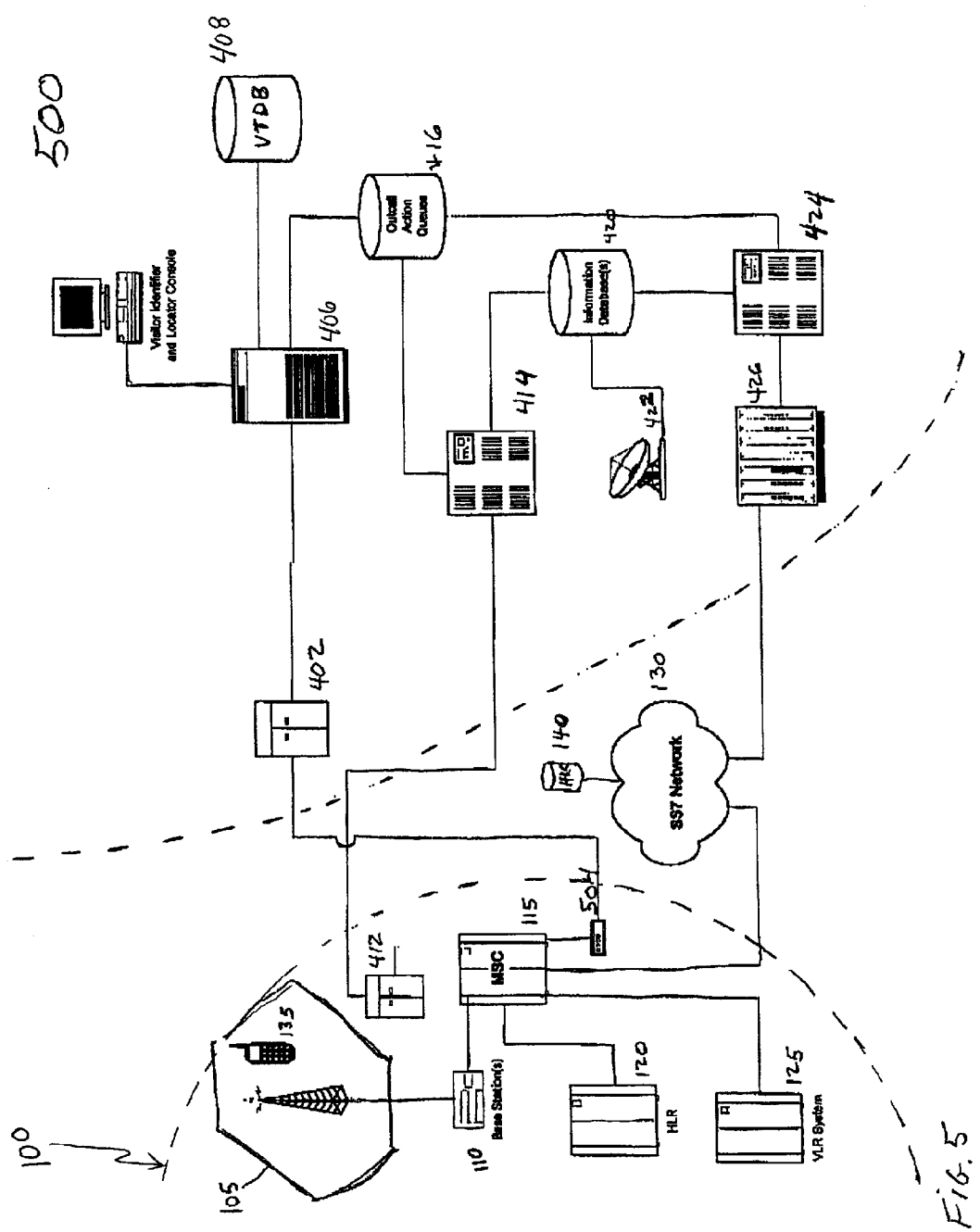
FIG. 5 is an illustration of a visitor information system in accordance with an embodiment of the present invention.

Referring now to FIG. 5, a visitor information system 500 in accordance with an embodiment of the present invention will be described. The system 500 uses redundant transmission of roamer messages by the MSC 115 to the VLR. The system 500 comprises the same elements as system 400 (FIG. 4) except it does not comprise the IS-41 Monitor and Filter (IMF) 402. The system 500 instead comprises a Data Connection 504 that connects the VILP 406 to the MSC 115.

It should be understood from the above description that this invention is intended to provide a method of deriving certain specific information from multiple wireless networks in a geographic or market area and using that information to provide information messaging to roamers, classified as business or pleasure travelers.

It should be further understood from the above description that the roamer trigger is information derived from "naturally occurring" events or processes inside a wireless system for use outside of the wireless system. It is a gateway of information on and to the roamer for use in determining potential individually tailored, per roamer, services and delivery methods. The roamer controls the services rendered after the initial call back. The "roamer trigger" can be derived from multi-standard networks for use outside of the mobile carriers. The "roamer trigger" is different from the "natural" messaging inside of a wireless network in that its use is for determination of content, type and delivery technology to deliver information services and messaging to the roamer from outside of the mobile network, such as via IVR/SMS servers.

It should be understood that, in one embodiment of the present invention, the roamer trigger includes the following information:

Notification that the roamer has entered the network
Base station identification or location information
Call Back information
Cellular telephone handset information
Roamer status
Network identification After receiving the roamer trigger, a service center may perform the following functions:

Translation of SS7 messages
Mapping of Base Station Location
Initiation of Call Back Through the Network to the Roamer
Record of Message, Time and Count for Billing
Buffering of Incoming and Outgoing Messages and Capacity Management
Selection of Call Back Message based on one or more of the following:
Last message, network, time of day, location, profile It should be further understood that the Service Center (IP/IVR/ISP) may be connected to multiple wireless networks (such as AMPS/TDMA, PCS/GSM, CDMA). When connected to multiple wireless networks, the service center may be referred to as a service bureau handling the needs of multiple wireless networks.

From the foregoing description, it will be appreciated that the present invention is directed towards a system and a method for providing information services to wireless telephones. The present invention has been described in relation to particular embodiments which are intended in all respects to be illustrative rather than restrictive. Those skilled in the art will understand that the principles of the present invention may be applied to, and embodied in, various combinations of hardware and software with various types of interfaces and transmission technology. Alternative embodiments will become apparent to those skilled in the art to which the present invention pertains without departing from its spirit and scope. Accordingly, the scope of the present invention is described by the appended claims and supported by the foregoing description.

We claim:

1. A method for providing information services to a wireless device roaming in a wireless system, comprising the steps of:

obtaining normal network message traffic information from the wireless system, and transmitting the normal network message traffic information to a protocol converter;

in the protocol converter, extracting roamer information from the normal network message traffic information, and converting the roamer information into a protocol analyzer format;

transmitting a query to a Mobile Switching Center requesting information regarding the wireless device's serving cell;

receiving information regarding the wireless device's serving cell;

combining the information regarding the wireless device's serving cell with the converted roamer information to form a roamer trigger;

transmitting the roamer trigger to a protocol analyzer;

in the protocol analyzer, extracting specific information pieces regarding the wireless device;

transmitting the extracted specific information pieces to a data interpreter;

in the data interpreter, translating the specific information pieces into format needed to determine a message to be sent to the wireless device; and transmitting the specific information pieces to a message selection and delivery system.

2. The method of claim 1, wherein the step of obtaining normal network message traffic information comprises tapping a connection between a Visitor Location Register and a Mobile Switching Center in the wireless system.

3. The method of claim 1, wherein the step of obtaining normal network message traffic information comprises receiving a copy of messages transmitted between a Visitors Location Register and a Mobile Switching Center.

4. The method of claim 1, wherein the step of obtaining normal network message traffic information comprises obtaining the normal network message traffic information in messages received from a Visitors Location Register and responses made to inquiries directed to a Mobile Switching Center and the Visitors Location Register.

5. The method of claim 1, wherein the step of obtaining normal network message traffic information comprises using an IS-41 monitoring device to monitor IS-41 traffic.

6. The method of claim 5, wherein the step of extracting roamer information from the normal network message traffic information comprises using the IS-41 monitoring device to extract roamer information from the normal network message traffic information.

7. The method of claim 1, wherein the wireless device is a cellular telephone.

8. The method of claim 1 further comprising causing the system to choose a message to transmit to the wireless device based on the specific information pieces and transmitting the message to the wireless device.

* * * * *